United States Patent
Beck nee Trescol et al.

(10) Patent No.: US 6,905,717 B2
(45) Date of Patent: Jun. 14, 2005

(54) EDIBLE EMULSION COMPRISING LIVE MICRO-ORGANISMS AND DRESSINGS OR SIDE SAUCES COMPRISING SAID EDIBLE EMULSION

(75) Inventors: Laurence Beck nee Trescol, Talant (FR); Gilles Franch, Dijon (FR); Isabelle Geneau de Lamarliere, Longecourt en Plaine (FR)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 222 days.

(21) Appl. No.: 09/974,629

(22) Filed: Oct. 10, 2001

(65) Prior Publication Data

US 2002/0076467 A1 Jun. 20, 2002

(30) Foreign Application Priority Data

Oct. 11, 2000 (FR) .......................................... 00 13010

(51) Int. Cl.[7] .............................................. A23C 23/00
(52) U.S. Cl. ........................... 426/61; 426/43; 426/602
(58) Field of Search ............................ 426/61, 43, 602, 426/36, 99, 98, 60

(56) References Cited

U.S. PATENT DOCUMENTS

| | | | | |
|---|---|---|---|---|
| 3,959,493 A | * | 5/1976 | Baalsrud et al. ............... | 426/2 |
| 3,971,852 A | * | 7/1976 | Brenner et al. ............. | 426/103 |
| 4,310,554 A | * | 1/1982 | Olson et al. .................. | 426/40 |
| 4,590,086 A | * | 5/1986 | Takahashi et al. .......... | 426/602 |
| 4,626,443 A | | 12/1986 | Takahashi et al. | |
| 4,650,690 A | * | 3/1987 | Bams et al. ................. | 426/602 |
| 4,737,369 A | * | 4/1988 | Asano et al. .................. | 426/98 |
| 5,332,595 A | | 7/1994 | Gaonkar | |
| 5,399,368 A | * | 3/1995 | Garwood et al. ........... | 426/307 |
| 5,589,194 A | * | 12/1996 | Tsuei et al. .................. | 424/497 |
| 5,789,001 A | * | 8/1998 | Klopfenstein et al. ......... | 426/2 |
| 6,149,953 A | * | 11/2000 | Redding, Jr. .................. | 426/98 |
| 6,153,236 A | * | 11/2000 | Wu et al. ..................... | 426/98 |
| 6,592,916 B2 | * | 7/2003 | Soeda et al. .................. | 426/98 |

FOREIGN PATENT DOCUMENTS

| | | |
|---|---|---|
| EP | 0 141 477 | 5/1985 |
| EP | 0 508 701 | 10/1992 |
| EP | 0 997 075 | 5/2000 |
| JP | 62220186 | 9/1987 |
| JP | 5023133 | 2/1993 |
| JP | 9056351 | 3/1997 |

OTHER PUBLICATIONS

WPI Acc. No. 1987–310983/198744 Abstract of patent JP62220186A—1 p.
International Search Report on Appln. No. PCT/EP 01/11431 dated Jan. 25, 2002.

* cited by examiner

*Primary Examiner*—Carolyn Paden

(57) ABSTRACT

Dressing of W/O/W type containing bifidus m.o. in the internal waterphase. The m.o. can be present for taste reasons, but also for nutritional reasons. The emulsions are characterized in that the outer water phase comprise 0.1–9% organic acids.

11 Claims, No Drawings

EDIBLE EMULSION COMPRISING LIVE MICRO-ORGANISMS AND DRESSINGS OR SIDE SAUCES COMPRISING SAID EDIBLE EMULSION

BACKGROUND OF THE INVENTION

The present invention relates to water-in-oil-in-water edible emulsions comprising an internal aqueous phase, said internal aqueous phase comprising live micro-organisms in sufficient quantity to impart specific nutritional properties to said edible emulsion.

The invention relates to a water-in-oil-in-water edible emulsion comprising:
- an internal aqueous phase comprising live micro-organisms;
- a protective lipid phase for the micro-organisms, said internal aqueous phase and said lipid phase forming a primary water-in-oil emulsion;
- an external conservation aqueous phase in which the primary emulsion is dispersed.

The processing of water-in-oil-in-water edible emulsions using live micro-organisms in the internal aqueous phase of an edible water-in-oil-in-water emulsion is known already. The only known embodiments are concerned with dairy products or derivatives therefrom, forming a water-in-oil-in-water emulsion in which the internal aqueous phase comprises active bacterial bodies, the external aqueous phase being formed by a dairy product, whether fermented or not.

In addition to that, available information on active bacterial bodies or live micro-organisms used in the above mentioned dairy edible emulsion all refer to the use of the bifidus-type bacteria which, because of its properties and large availability, is a live organism which is widely used in the agro-food industry.

The basic principle for the implementation of such live micro-organisms-containing water-in-oil-in-water emulsions is that they should benefit from the presence of these live micro-organisms which impart specific properties and a specific organoleptic quality to the emulsion, whereas live micro-organisms would be destroyed when put into contact with the components of the external aqueous phase (organic acids) which give its organoleptic qualities to the emulsion (or to the dressing itself). This sets the problem of keeping micro-organisms alive in such emulsions or dressings.

Therefore, one technique which is frequently used consists in identifying and selecting bifidus-type bacteria which are particularly resistant, according to the medium or to the external phase in which the bacteria is to be preserved. Such techniques are not widely applied and can be extremely limitative, with their cost and implementation time being often incompatible with industrial requirements; the use of such techniques is therefore rather limited.

The modification of the very state of micro-organisms has also been contemplated, i.e. of the bifidus bacteria, and a modification of its state so as to get it in dried or frozen state after addition of a stabiliser has been envisaged. Other processes consisted in trying to obtain the bifidus bacteria in a powder form so as to increase its strength in an acid environment. Trials have also been carried out aiming at deep-freezing the bifidus bacteria or at getting it in a granular state, still with an aim to increasing its specific strength in an acid environment.

None of these techniques can be implemented in any given situations or with all types of live micro-organisms, nor can they be applied in water-in-oil-in-water edible emulsions other than those based on dairy products.

It is therefore an object of the present invention to offer a novel water-in-oil-in-water edible emulsion which would overcome the drawbacks mentioned above and which would be capable of comprising a sufficient level of live micro-organisms so as to provide the emulsion with specific nutritional properties and taste, said water-in-oil-in-water emulsion being sufficiently acid to be used as a side sauce.

Another object of the present invention is to offer a novel water-in-oil-in-water edible emulsion which can, at the level of its internal aqueous phase, favour a good conservation of live micro-organisms.

Another object of the present invention is to offer a novel water-in-oil-in-water edible emulsion which is not restricted by the use of a particular type or form of live micro-organisms.

Yet another object of the present invention is to offer a novel water-in-oil-in-water edible emulsion which is particularly simple to implement, thanks to the use of traditional ingredients, notably as carriers for live micro-organisms.

Yet a further object of the present invention is to offer a dressing or a side sauce, notably a salad sauce, comprising live micro-organisms, having particularly beneficial organoleptic and nutritional properties.

SUMMARY OF THE INVENTION

These objects are achieved by means of a water-in-oil-in water edible emulsion comprising:
- an internal aqueous phase comprising live micro-organisms;
- a protective lipid phase for the micro-organisms, said internal aqueous phase and said lipid phase forming a primary water-in-oil emulsion;
- an external conservation aqueous phase in which said primary dispersion is dispersed, characterised in that the external phase comprises between 0.1% and 9% of organic acids.

These objects are also achieved by a dressing or a side sauce, notably a salad sauce, comprising a water-in-oil-in-water edible emulsion comprising:
- an internal aqueous phase comprising live micro-organisms;
- a protective lipid phase for the micro-organisms, said internal aqueous phase and said lipid phase forming a primary water-in-oil emulsion;
- an external conservation aqueous phase in which said primary dispersion is dispersed, characterised in that the external phase comprises from 0.1% to 9% of organic acids.

DETAILED DESCRIPTION OF THE INVENTION

The objects of the present invention will be better understood in the light of the specification, tables and examples of the embodiments described hereafter, which are given by way of example and should not be construed as being a limitation to the present invention.

The water-in-oil-in-water edible emulsion of the invention comprises an internal aqueous phase comprising live micro-organisms, a protection lipid phase for the micro-organisms, said internal aqueous phase and said lipid phase being emulsified together so as to yield a primary emulsion. The water-in-oil-in-water edible emulsion according to the invention also includes an external conservation aqueous phase in which the primary emulsion as described earlier is then dispersed.

The water-in-oil-in water edible emulsion of the invention is more specifically, but not exclusively, aimed at forming a dressing or a side sauce, notably a sauce for salads, meat or fish, having a variable rheological state, which can be for example a liquid, creamy, semi-liquid or semi-solid state.

According to the invention, the internal aqueous phase comprises live active principles, i.e. micro-organisms, which can be—in a non limitative way—based on lactic ferments, lactic yeasts or lactic bacteria per se, or based on a simple or complex mixture of any of such ferments, yeasts or bacteria.

According to the invention, the internal aqueous phase is the phase in the final emulsion which will provide it with its specificities and specific nutritional and organoleptic qualities due to the presence of live micro-organisms and which will therefore make up the carrier medium for the live micro-organisms. According to the invention, the internal aqueous phase is advantageously formed by a mixture of water and of a carrier containing the micro-organisms. In a particularly interesting embodiment of the invention, the carrier is formed by yogurt or cottage cheese.

In order to maintain an acceptable level of live micro-organisms over time, as for example $10^6$ bacteria/gram of sauce, the acidity level of the internal aqueous phase should exceed a maximum acidity level of 1,5% acetic acid eq. in an emulsion according to the invention.

In an advantageous yet non limitative manner, the micro-organisms which can be used in the aqueous phase according to the invention are selected among the following species: *Lactobacillus Bulgaricus, Lactobacillus Casei, Lactobacillus Acidophillus, Lacococcus Lactis, Streptococcus Thermophilus, Bacterium Bifidum* and *Bifidobacterium Lingum*.

The main role of the protective lipid phase for the micro-organisms is to protect micro-organisms against the attack, and more specifically against the acidity, of the external aqueous phase, still enabling a primary emulsion to be achieved between the internal aqueous phase and the lipid phase itself. This is the reason why the protective lipid phase will be based on oil, more particularly on vegetable oil, and on a lipophilic emulsifier so as to yield a water-in-oil emulsion along with the internal aqueous phase. Emulsification operations will be carried out according to traditional techniques which are well known to those skilled in the art.

Advantageously, a primary emulsion having improved characteristics is obtained when the weight ratio between the internal aqueous phase and the lipid phase ranges from 1:1 to 1:4, preferably from 15:25 to 15:60, i.e. preferably from 0.6 to 0.25.

The mixture of the internal aqueous phase and the lipid phase can be achieved by means of a high shear emulsification technique which yields a fine emulsion so that the droplet size in the primary emulsion is smaller or equal to 5 microns, preferably smaller or equal to 1 micron.

The water-in-oil-in-water edible emulsion according to the invention also comprises an external conservation aqueous phase in which the primary emulsion is dispersed, the overall role of said phase being to insure the preservation of the emulsion and to contribute to its organoleptic feature, i.e. to the taste of the final edible emulsion. In that end, the external aqueous phase comprises organic acids which give it its own taste and flavour, said organic acids comprising, either alone or in combination, and in a non limitative way, acetic acid, citric acid, malic acid tartaric acid, gluconic acid or lactic acid.

As organic acids impart to the final emulsion an acidity to which live micro-organisms are particularly sensible, it is crucial to limit the level of organic acids without having a negative impact on the taste or flavour, and more generally speaking on the organoleptic properties of the final edible emulsion.

According to the invention, it has been shown and demonstrated that the external aqueous phase of the edible emulsion should comprise from 0.1% to 9% organic acids so as to achieve good conservation of the product over time, without the growth of undesirable germs, while obtaining an edible emulsion having satisfactory taste, flavour and organoleptic properties and maintaining micro-organisms alive in the internal phase.

Depending on the selected embodiments, the external aqueous phase can also comprise a hydrophilic emulsifier, or even yogurt, so as to provide an interesting variation in taste, mainly for embodiments concerning dressings or side sauces, notably salad sauces.

The mixture of the external aqueous phase and of the primary emulsion can be achieved via any of the techniques and processes which are well known to those skilled in the art and notably via a slow emulsification process of the STEPHAN type, preferably a cold process, and care should be taken to make sure that the droplet size obtained in the final emulsion is in the range of from 10 to 200 microns, preferably from 50 and 100 microns.

It is also possible to produce an external aqueous phase obtained by a process involving a cooking operation.

Generally speaking, care should be taken so as to make sure that a final water-in-oil-in-water edible emulsion is obtained, in which the weight ratio between the primary emulsion and the external aqueous phase is between 1:80 and 40:60, i.e. between 4 and 0.666.

Practically speaking, care should be taken so as to obtain a final edible emulsion in which the quantity of lipid phase is always greater than that of the internal aqueous phase, the proportion of the lipid phase in the final edible emulsion being ideally close to 25% although this level is difficult to achieve.

The preferred embodiments of the invention relate to a water-in-oil-in-water emulsion formed by a dressing for salads. Other preferred embodiments of the invention are side sauces having a low level of oil.

In both cases, dressings and side sauces, notably salad sauces, will include flavour ingredients admixed in the water-in-oil-in-water emulsion. In such a case, flavour ingredients can be in a liquid or semi-liquid form and can be based on mustard, flavouring herbs, flavouring vegetables (garlic, onions, etc.).

EXAMPLE 1

In this series of examples, trial 1 is a water-in-oil-in-water edible emulsion according to the invention, trial 2 being a simple water-in-oil emulsion which does not incorporate the external aqueous phase.

In trial 1, the overall yogurt taste of the considered emulsions is provided by the external yogurt aqueous phase which is pasteurised.

Mixtures of the different phases have been produced according to traditional slow emulsification techniques of the STEPHAN-type.

TABLE 1

Example 1

|  | Trial 1 (W-O-W) | Trial 2 (W-O) |
|---|---|---|
| 1. INTERNAL AQUEOUS PHASE | | |
| Water | | |
| Sugar | 3.50 | 16.85 |
| Salt | 1.00 | |
| Yogurt | 0.00 | 1.00 |
| Alcohol vinegar | 10.00 | 20.00 |
| Xanthan | 0.00 | 3.00 |
|  |  | 0.15 |
| SUB TOTAL | 14.50 | 41.00 |
| 2. LIPID PHASE | | |
| Sunflower oil | 58.60 | 58.60 |
| PRPG (lipophilic emulsifier) | 0.40 | 0.40 |
| SUB TOTAL | 59.00 | 59.00 |
| 3. EXTERNAL AQUEOUS PHASE | | |
| 10° alcohol vinegar | 3.00 | |
| Salt | 0.50 | |
| Water | 12.65 | |
| Tween 60 (hydrophilic emulsifier) | 0.20 | |
| Xanthan | 0.15 | |
| Yogurt | 10.00 | |
| SUB TOTAL | 26.50 | |
| TOTAL | 100.00 | 100.00 |
| Quantity of living germs (Lactobacillus Bulgaricus + Streptococcus Thermophilus) | | |
| At t0 | $1.00 \cdot 10^7$ | $4.00 \cdot 10^7$ |
| At t + 1 month at 8° C. | $5.10 \cdot 10^7$ | $6.20 \cdot 10^7$ |
| At t + 2 months at 8° C. | $7.00 \cdot 10^7$ | $1.00 \cdot 10^4$ |

The follow-up of the number of living bacteria in the emulsions, stored at 8° C., has been carried out at regular intervals, i.e. one month and two months after the initial emulsions were produced.

A comparative analysis of trials results indicates a progressive destruction of micro-organisms after two months in a water-in-oil emulsion, whereas micro-organisms are being preserved after two months in a water-in-oil-in-water emulsion, despite the presence of a significant acidity level of the external phase due to the use of vinegar.

TABLE 2

|  | TRIAL 1 | TRIAL 2 |
|---|---|---|
| PH | 3.50 | 3.10 |
| Overall acidity (° ac) | 0.30 | 0.32 |
| Dry extract (%) | 61.60 | 61.00 |

Table 2 above shows, for each of trials 1 and 2, the overall physico-chemical features of the produced edible emulsions.

EXAMPLE 2

Table 3

In this series of trials, Trials A and B correspond to water-in-oil-in-water edible emulsions according to the invention, trial C corresponds to a simple water-in-oil emulsion which does not incorporate the internal aqueous phase.

In each of these examples, the overall yogurt flavour of the considered emulsions is imparted by the external aqueous phase.

The various phases have been mixed together via traditional STEPHAN-type emulsification techniques.

It can be noted that the major differences between trials A and B concern the quantity of vinegar in the external phase which leads to an increase in acidity in trial B as compared to trial A.

The comparative analysis of the thus obtained emulsions shows that in the case of trial C which is not according to the invention, there is a significant destruction of micro-organisms within 1 month after emulsions have been produced.

Conversely, it can be noted that in the examples according to the invention (trials A and B), there is a difference in the conservation of micro-organisms strains 1 month after the emulsions have been manufactured, indicating an improved conservation for trial A in which the acid level in the external phase is lower.

This shows the negative impact of an increase in the acidity level of the external aqueous phase, indicating a partial permeation of the protective lipid phase in the case of trial B, leading to a destruction of the strains; trial A (3% of 10° alcohol vinegar in the external phase) yielded good results.

The embodiment of this example clearly shows the protective effect of the intermediary oily membrane formed by the lipid phase over the conservation of micro-organisms.

A follow-up of the quality of live micro-organisms in the product stored at 8° C., has been carried out at t0 and 1 month after the final emulsions were manufactured; this was achieved by means of two distinct measurements so as to reduce error margins.

TABLE 3

Example 2

| TYPE OF EMULSION | TRIAL A (W-O-W) | TRIAL B (W-O-W) | TRIAL C (O-W) |
|---|---|---|---|
| 1. INTERNAL AQUEOUS PHASE | | | |
| Water | 3.50 | 3.50 | |
| Sugar | 1.00 | 1.00 | |
| Yogurt | 10.00 | 10.00 | |
| SUB TOTAL | 14.50 | 14.50 | 0.00 |
| 2. LIPID PHASE | | | |
| Sunflower oil | 58.60 | 58.60 | 60.00 |
| PRPG (lipophilic emulsifier) | 0.40 | 0.40 | |
| SUB TOTAL | 59.00 | 59.00 | 60.00 |
| 3. EXTERNAL AQUEOUS PHASE | | | |
| 10° alcohol vinegar | | | |
| Sugar | 3.00 | 9.00 | 3.00 |
| Salt | 0.00 | 0.00 | 1.00 |
| Water | 0.50 | 0.50 | 0.50 |
| Tween 60 (hydrophilic emulsifier) | 12.65 | 6.65 | 15.15 |
|  | 0.20 | 0.20 | 0.20 |
| Xanthan | 0.15 | 0.15 | 0.15 |
| Yogurt | 10.00 | 10.00 | 20.00 |
| SUB TOTAL | 26.50 | 26.50 | 40.00 |
| TOTAL | 100.00 | 100.00 | 100.00 |
| 4. ANALYSIS | | | |
| PH | 3.55 | 3.33 | 3.47 |
| Total acidity (%) | 0.44 | 1.12 | 0.48 |
| Salt (%) | 0.53 | 0.56 | 0.59 |
| Dry extract | 63.80 | 63.40 | 62.30 |

TABLE 3-continued

Example 2

| TYPE OF EMULSION | TRIAL A (W-O-W) | TRIAL B (W-O-W) | TRIAL C (O-W) |
|---|---|---|---|
| 5. MICRO-BIOLOGICAL ANALYSIS AT t0 (germs/g) | | | |
| (LB + LT)* 1$^{st}$ measurement | $7.00 \cdot 10^6$ | $1.40 \cdot 10^6$ | $3.30 \cdot 10^7$ |
| (LB + ST)* 2$^{nd}$ measurement | $5.00 \cdot 10^6$ | $1.00 \cdot 10^6$ | $3.30 \cdot 10^7$ |
| Total mesophilic germs | <10 | <10 | 10 |
| Yeasts | <50 | <50 | <50 |
| Moulds | <50 | <50 | |
| Faec. Col. | <10 | <10 | <10 |
| 6. MICRO-BIOLOGICAL ANALYSIS AFTER 1 MONTH AT 8° C. (germs/g) | | | |
| (LB + ST)* 1$^{st}$ measurement | $1.30 \cdot 10^3$ | 20 | 10 |
| (LB + ST) 2$^{nd}$ measurement | $1.50 \cdot 10^4$ | 70 | $5.00 \cdot 10^2$ |

*LB = Lactobacillus Bulgaricus
ST = Streptococcus Thermophilus

Trials lead to the conclusion that water-in-oil-in-water edible emulsions can be produced which initially contain live micro-organisms, said water-in-oil-in-water edible emulsions having an overall acidic character along with nutritional properties linked to the presence of organic acids, with the proviso that live micro-organisms are protected by a protective lipid phase and with the proviso that the level of organic acids is limited, as well as the acidity level of the internal aqueous phase. These measures then make it possible to maintain the activity of micro-organisms over a sufficient period of time and hence to obtain a water-in-oil-in-water edible emulsion having strong organoleptic and nutritional qualities.

What is claimed is:

1. A water-in-oil-in-water edible emulsion comprising:
   an internal aqueous phase comprising live micro-organisms;
   a lipid phase to protect micro-organisms, said internal aqueous phase and said lipid phase forming a primary water-in-oil emulsion;
   a conservation external aqueous phase in which the primary emulsion is dispersed
   wherein the external aqueous phase comprises between 0.1% and 9% of organic acids and the internal aqueous phase has a maximal acidity level below 1.5% acetic acid equivalent, and the internal aqueous and phase lipid phase are at a weight ratio in the range of 1:1 to 1:4.

2. An emulsion as claimed in claim 1, wherein the internal aqueous phase comprises micro-organisms based on lactic ferments, lactic yeasts or lactic bacteria, either mixed or not.

3. An emulsion as claimed in claim 2, wherein the internal aqueous phase is comprised of a mixture of water and of a carrier for the micro-organisms.

4. An emulsion as claimed in claim 3, wherein the carrier is formed by yoghurt or cottage cheese.

5. An emulsion as claimed in claim 1, wherein micro-organisms are selected among the following strains: *Lactobacillus Bulgaricus, lactobacillus Casei, Lactobacillus Acidophilus, Lactococcus Lactis, Streptococcus Thermophilus, Bifidobacterium Bifidum, Bifidobacterium Lingum.*

6. An emulsion as claimed in claim 1, wherein the lipid phase is based on vegetable oil and on a lipophilic emulsifier to yield a water-in-oil emulsion with the internal aqueous phase.

7. An emulsion as claimed in claim 1, wherein the primary emulsion: external aqueous phase weight ratio is ranging from 80:20 to 40:60.

8. An emulsion as claimed in claim 1, wherein the droplet size in the primary emulsion is below or equal to 5 microns, preferably below or equal to 1 micron.

9. An emulsion as claimed in claim 1, wherein the droplet size in the final emulsion ranges from 1 to 200 microns.

10. Dressing or side sauce, notably salad sauce, comprising an emulsion according to claim 1.

11. A dressing or a side sauce, notably a salad sauce, as claimed in claim 10, wherein it comprises flavouring ingredients in admixture with the emulsion.

* * * * *